United States Patent
Yoshida (10) Patent No.: US 10,096,821 B2
(45) Date of Patent: *Oct. 9, 2018

(54) LITHIUM SECONDARY BATTERY

(75) Inventor: Jun Yoshida, Susono (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 892 days.

This patent is subject to a terminal disclaimer.

(21) Appl. No.: 14/115,224

(22) PCT Filed: May 2, 2011

(86) PCT No.: PCT/JP2011/060557
§ 371 (c)(1),
(2), (4) Date: Nov. 1, 2013

(87) PCT Pub. No.: WO2012/150636
PCT Pub. Date: Nov. 8, 2012

(65) Prior Publication Data
US 2014/0065484 A1    Mar. 6, 2014

(51) Int. Cl.
*H01M 4/00* (2006.01)
*H01M 4/36* (2006.01)
(Continued)

(52) U.S. Cl.
CPC ............ *H01M 4/366* (2013.01); *C01B 25/37* (2013.01); *C01B 25/45* (2013.01);
(Continued)

(58) Field of Classification Search
CPC .... H01M 4/366; H01M 4/5825; H01M 4/625; H01M 4/36; H01M 10/0525
See application file for complete search history.

(56) References Cited

U.S. PATENT DOCUMENTS 6,296,830 B1 * 10/2001 Oh .................. C01G 45/02
423/179.5
2003/0054253 A1 * 3/2003 Morishima ......... H01M 2/0222
429/231.95
(Continued)

FOREIGN PATENT DOCUMENTS

CN          1785823 A      6/2006
CN        101339994 A      1/2009
(Continued)

OTHER PUBLICATIONS

Garcia-Moreno et al. "Influence of the Structure on the Electrochemical Performance of Lithium Transition Metal Phosphates as Cathodic Materials in Rechargeable Lithium Batteries: A New High-Pressure Form of LiMPO4 (M = Fe and Ni)", Chemistry of Materials 2001 13 (7), 2455-2455—DOI: 10.1021/cm012005g.*

(Continued)

*Primary Examiner* — Nicholas P D'Aniello
(74) *Attorney, Agent, or Firm* — Finnegan, Henderson, Farabow, Garrett & Dunner, LLP (57) ABSTRACT

An object of the present invention is to provide a lithium secondary battery that has a lithium nickel phosphate compound in the positive electrode, is free of collapse of the crystal structure even at high potentials and is resistant to cycle deterioration. The lithium secondary battery according to the present invention has a positive electrode active material. This positive electrode active material contains a lithium nickel phosphate compound that is represented by the general formula $LiNi_{(1-x)}Mn_xPO_4$ (wherein $0 < x \leq 0.15$) and that has an orthorhombic crystal structure belonging to space group Cmcm.

7 Claims, 5 Drawing Sheets

(51) Int. Cl.
*C01B 25/37* (2006.01)
*C01B 25/45* (2006.01)
*H01M 4/58* (2010.01)
*H01M 10/0525* (2010.01)
*H01M 4/62* (2006.01)

(52) U.S. Cl.
CPC ......... *H01M 4/5825* (2013.01); *H01M 4/625* (2013.01); *H01M 10/0525* (2013.01)

(56) References Cited

U.S. PATENT DOCUMENTS

| | | |
|---|---|---|
| 2006/0292444 A1 | 12/2006 | Chiang et al. |
| 2009/0081534 A1 | 3/2009 | Takami et al. |
| 2010/0028777 A1* | 2/2010 | Ueda ............... H01M 4/133 429/221 |
| 2010/0233540 A1 | 9/2010 | Choy et al. |
| 2012/0121985 A1 | 5/2012 | Yoshida |
| 2012/0129050 A1* | 5/2012 | Tarascon ............ C01B 25/26 429/221 |
| 2012/0264019 A1* | 10/2012 | Saka ............... C01B 25/45 429/221 |
| 2014/0065484 A1 | 3/2014 | Yoshida |

FOREIGN PATENT DOCUMENTS

| | | |
|---|---|---|
| CN | 102020260 A | 4/2011 |
| JP | 11-25983 | 1/1999 |
| JP | 2004-63270 | 2/2004 |
| JP | 1754275 A | 3/2006 |
| JP | 2007-42440 | 2/2007 |
| JP | 2010-040272 A | 2/2010 |
| JP | 2010-192230 A | 9/2010 |
| JP | 2010-267501 A | 11/2010 |
| JP | 2011-213587 A | 10/2011 |
| WO | WO 2011/013243 | 2/2011 |
| WO | WO2012-150636 A1 | 11/2012 |

OTHER PUBLICATIONS

Restriction Requirement issued in U.S. Appl. No. 14/353,430 dated Feb. 26, 2015.
Office Action issued in U.S. Appl. No. 14/353,430 dated Jun. 3, 2016.
Final Office Action issued in U.S. Appl. No. 14/353,430 dated Feb. 9, 2017.
Chen, Guoying et al., "Thermal Instability of Olivine-Type $LiMnPO_4$ Cathodes" Journal of Power Sources, 195 (2010) pp. 1221-1224.
Notice of Allowance issued in U.S. Appl. No. 14/353,430 dated Aug. 31, 2017.
Supplemental Notice of Allowability issued in U.S. Appl. No. 14/353,430 dated Jan. 2, 2018.
D. Kellerman et al., "Synthesis and Characterization of the $LiMnP_{1-x}V_xO_{4-\delta}$ Solid Solutions," Advances in Science and Technology, vol. 65, 2010, pp. 269-274.
Supplemental Notice of Allowability issued in U.S. Appl. No. 14/353,430 dated Nov. 8, 2017.

* cited by examiner

LITHIUM SECONDARY BATTERY

CROSS-REFERENCE TO RELATED APPLICATIONS

This application is a national phase application of International Application No. PCT/JP2011/060557, filed May 2, 2011, the content of which is incorporated herein by reference.

TECHNICAL FIELD

The present invention relates to a lithium secondary battery and to a method of producing a positive electrode active material used by this lithium secondary battery.

BACKGROUND ART

Rechargeable batteries, i.e., secondary batteries, have become increasingly important in recent years as vehicle-mounted power sources and as power sources for personal computers and portable and mobile electronic devices. In particular, lithium secondary batteries (typically lithium ion secondary batteries), which are light and provide high energy densities, are expected to be favorably used as vehicle-mounted large-scale power sources. In lithium secondary batteries of this type, charge and discharge occur by the shuttling of the lithium (Li) ion back and forth between a positive electrode and a negative electrode that are structural components of the battery, and the positive electrode material (positive electrode active material) is the most important component for determining the battery performance. For example, the discharge capacity is established by how much Li ion can be inserted into and extracted from the positive electrode active material, and the resulting battery voltage varies as a function of the materials used and the crystal structure.

Attention is currently being focused on olivine-type $LiMPO_4$ (M: Fe, Ni, Mn, Co, and so forth), which has a crystal structure in the Pnma space group, for the positive electrode material of lithium secondary batteries. Within this series, $LiNiPO_4$ is expected to be a high-potential positive electrode material because it exhibits a high potential of 5 V or more. Patent Literature 1 and Patent Literature 2 are examples of the prior art for this type of olivine $LiNiPO_4$.

CITATION LIST

Patent Literature

Patent Literature 1: Japanese Patent Application Publication No. H11-025983
Patent Literature 2: Japanese Patent Application Publication No. 2004-063270

SUMMARY OF INVENTION

However, the crystal structure of olivine $LiNiPO_4$ is unstable at high potentials, and a problem has been that the crystal structure collapses due to, for example, Ni elution, when the state of charge reaches a high potential and cycle deterioration is then prone to appear.

The present invention was pursued considering these points and takes as its main object the introduction of a lithium secondary battery that has a lithium nickel phosphate compound at the positive electrode and as a result is free of collapse of the crystal structure even at high potentials and resists cycle deterioration. A further object is to provide a favorable method of producing a lithium secondary battery that exhibits such a performance.

The positive electrode active material used in the lithium secondary battery of the present invention is a novel material having a heretofore unreported crystal structure.

That is, this positive electrode active material contains a lithium nickel phosphate compound represented by the following general formula $LiNi_{(1-x)}Mn_xPO_4$ (wherein $0 < x \leq 0.15$)

and having an orthorthorhombic crystal structure belonging to space group Cmcm.

This lithium nickel phosphate compound having an orthorhombic crystal structure in space group Cmcm has a crystal structure that is more stable at high potentials than the conventional olivine-type structure belonging to space group Pnma, and, for example, the former's crystal structure is resistant to collapse even when charging is carried out to 6 V. Due to this, the cycle characteristics can be improved in a lithium secondary battery that uses this lithium nickel phosphate compound in its positive electrode active material.

In a preferred embodiment of the herein disclosed lithium secondary battery, at least a portion of the particle surface in this positive electrode active material is coated with a carbon material. Coating the particle surface of the positive electrode active material with a carbon material can compensate for the low electrical conductivity of the lithium nickel phosphate compound.

The present invention also provides a method of producing the positive electrode active material that is used in all of the herein disclosed lithium secondary batteries. This production method comprises a step of producing a starting material mixed solution by mixing, in a solvent, starting materials for a positive electrode active material formed of a lithium nickel phosphate compound represented by the following general formula $LiNi_{(1-x)}Mn_xPO_4$ (wherein $0 < x \leq 0.15$)

the starting materials being prepared so as to provide a molar ratio between manganese (Mn) and nickel (Ni) of $0 < Mn/(Ni+Mn) \leq 0.15$. This production method further comprises a step of heating this starting material mixed solution to obtain a precipitate. It further comprises a step of pre-firing this precipitate to obtain a precursor. It further comprises a step of coating at least a portion of the particle surface in this precursor with a carbon material. It further comprises a step of subjecting the carbon-coated pre-fired material to a main firing in the temperature region of 600° C. to 900° C.

The lithium nickel phosphate compound having an orthorhombic crystal structure in space group Cmcm can be favorably produced when the precursor is subjected to the main firing in the temperature region of 600° C. to 900° C. because, in accordance with the production method of the present invention, the individual sources have been prepared so as to provide a molar ratio between manganese (Mn) and nickel (Ni) of $0 < Mn/(Ni+Mn) \leq 0.15$ and the main firing is performed in a state in which the precursor particle surface is coated with a carbon material.

This main firing is carried out under an inert gas atmosphere in a preferred embodiment of the herein disclosed method of producing a positive electrode active material. A more stable production of the lithium nickel phosphate compound having an orthorhombic structure in space group Cmcm can be achieved by carrying out the main firing under an inert gas atmosphere.

The coating with the carbon material is carried out by treatment with a ball mill in a preferred embodiment of the herein disclosed method of producing a positive electrode active material. A mechanochemical reaction is brought about by the heat of friction that is produced during this ball mill treatment process and this can degrade the impurity phase (starting materials and reaction by-products) left present due to an inadequate reaction. As a consequence, the target compound is made even more uniform as the pre-firing and main firing are traversed and the purity of the lithium nickel phosphate compound can be boosted even further.

In a preferred embodiment of the herein disclosed method of producing a positive electrode active material, the amount of the carbon material coating is 10% by mass to 40% by mass with respect to the total mass of the precursor. At below this range, a lithium nickel phosphate compound in space group Cmcm may not be consistently obtained. In addition, the lithium nickel phosphate compound-carbon material composite (the positive electrode active material) provided by the main firing may have a reduced electronic conductivity. On the other hand, at above this range, due to the lower amount of lithium nickel phosphate compound in the positive electrode active material, a declining trend may appear for the energy density of the lithium secondary battery fabricated using such a positive electrode active material.

A lithium secondary battery in which the thusly obtained lithium nickel phosphate compound-carbon material composite is provided in the positive electrode active material is resistant to the cycle deterioration brought about by changes in crystal structure even when charging is performed to high potentials and as a consequence is provided with a performance that is well adapted for application as a vehicle-mounted battery. The present invention therefore also provides a vehicle equipped with the herein disclosed lithium secondary battery (possibly in the form of a battery pack in which a plurality of the lithium secondary batteries are connected). In particular, a vehicle (for example, an automobile) is provided in which this lithium secondary battery is provided as the drive power source (typically the drive power source in a hybrid vehicle or an electric vehicle).

DESCRIPTION OF EMBODIMENTS

Embodiments according to the present invention are described in the following with reference to the drawings. In the drawings described below, the same reference number is assigned in the description to members and locations that carry out the same function. The dimensional relationships (length, width, thickness, and so forth) in the figures do not reflect actual dimensional relationships. Matters required for the execution of the present invention but not particularly described in this Description (for example, the structure of and method of producing the electrode assembly containing the positive electrode and negative electrode, the structure of and method of producing the separator and electrolyte, the general art related to the fabrication of lithium secondary batteries and other batteries) can be understood as design matters for the individual skilled in the art based on the conventional art in the pertinent field.

The positive electrode active material used in the lithium secondary battery of the present embodiment is a lithium nickel phosphate compound that has a crystal structure in the orthorhombic crystal system in space group Cmcm therein. This lithium nickel phosphate compound having an orthorhombic crystal structure in space group Cmcm has a more stable crystal structure at high potentials than the conventional olivine-type structures belonging to space group Pnma, and, for example, the former's crystal structure is resistant to collapse even during charging to 6 V. This results in improved cycle characteristics for a lithium secondary battery that uses this lithium nickel phosphate compound in its positive electrode active material.

The lithium nickel phosphate compound having an orthorhombic crystal structure in space group Cmcm used in the lithium secondary battery of the present embodiment is specifically represented by the general formula $LiNi_{(1-x)}Mn_xPO_4$ (wherein $0<x\leq0.15$). That this lithium nickel phosphate compound has an orthorhombic crystal structure in space group Cmcm can be confirmed by, for example, x-ray diffraction measurements.

Here, the value of x in the general formula given above shows the extent to which the Ni in this lithium nickel phosphate compound is substituted by Mn. With regard to the available range for this x, it may assume any real number in the range $0<x\leq0.15$ as long as the indicated crystal structure of the $LiNi_{(1-x)}Mn_xPO_4$ is not destroyed and this structure can be retained. When the value of x exceeds 0.15, a lithium nickel phosphate compound having an orthorhombic crystal structure in space group Cmcm may not be obtained. $0<x\leq0.15$ is favorable for more reliably obtaining the phase of the orthorhombic crystal structure in space group Cmcm, while $0<x\leq0.1$ is preferred, $0<x\leq0.05$ is more preferred, $0<x\leq0.03$ is even more preferred, and $0<x\leq0.01$ is particularly preferred (for example, $0.0001\leq x\leq0.01$).

The lithium nickel phosphate compound having an orthorhombic crystal structure in space group Cmcm used in the lithium secondary battery of the present embodiment is preferably a particulate, and its average particle diameter is preferably 1 μm to 10 μm (particularly 2 μm to 4 μm). This average particle diameter refers to the median diameter (d50) and can be conveniently measured using various commercially available particle distribution analyzers based on laser diffraction/scattering methods.

In order to compensate for its electronic conductivity, the lithium nickel phosphate compound having an orthorhormbic crystal structure in space group Cmcm used in the lithium secondary battery of the present embodiment can be formed into a composite with a carbon material. In this embodiment, at least a portion (preferably at least 50% of the surface area and more preferably at least 70%) of the particle surface in the lithium nickel phosphate compound is coated with a carbon material. This carbon material can be exemplified by carbon black (acetylene black (AB) and so forth) and by carbon fiber. While there are no particular limitations here, the preferred amount of the carbon material, expressed with reference to the total mass of the lithium nickel phosphate compound, is approximately 1 to 40% by mass and is generally preferably brought to 5 to 30% by mass.

The lithium nickel phosphate compound having an orthorhombic crystal structure in space group Cmcm used in the lithium secondary battery of the present embodiment can be synthesized by coating a carbon material on the particle surface of a precursor obtained by a liquid-phase method and subsequently firing at a prescribed temperature. Specifically, this lithium nickel phosphate compound can be produced through a starting material mixed solution production step, a heating step, a pre-firing step, a carbon material coating step, and a main firing step. Each of these processes is described in detail in the following.

<The Starting Material Mixed Solution Production Step>

A starting material mixed solution is prepared in the starting material mixed solution production step by mixing, in a prescribed solvent, the starting materials (Li source, Ni source, Mn source, P source) for forming the lithium nickel phosphate compound; these are selected as appropriate in conformity with the structural elements of the above-described lithium nickel phosphate compound having an orthorhombic crystal structure in space group Cmcm.

One or two or more compounds comprising at least an Li source, an Ni source, an Mn source, and a P source are selected as appropriate and used as the starting materials. There are no particular limitations on the Li source, Ni source, Mn source, and P source as long as the target lithium nickel phosphate compound can be formed by the final firing. For example, various salts (for example, acetate salts), hydroxides, oxides, and so forth having the preceding as structural elements can be selected. These may be used individually or two or more may be used in combination.

The following are particularly preferred examples: for the Li source, lithium acetate, lithium carbonate, and lithium hydroxide; for the Ni source, nickel acetate, nickel carbonate, nickel oxide, nickel nitrate, nickel nitrate, nickel hydroxide, and nickel oxyhydroxide; for the Mn source, manganese acetate, manganese carbonate, manganese oxide, manganese nitrate, manganese hydroxide, and manganese oxyhydroxide; and for the P source, ammonium phosphate ($NH_4H_2PO_4$), phosphoric acid ($H_3PO_4$), and triethyl phosphite ($C_6H_{15}O_3P$).

As has been described in the preceding, the herein disclosed lithium nickel phosphate compound has an orthorhombic crystal structure belonging to space group Cmcm. One condition favorable for producing this lithium nickel phosphate compound having an orthorhombic crystal structure in space group Cmcm is to carry out production by mixing the individual sources so as to provide a molar ratio between manganese (Mn) and nickel (Ni) of $0<Mn/(Ni+Mn)\leq0.15$. Preferably a small amount of the Mn source is added and mixed with the source materials so as to provide a molar ratio between manganese (Mn) and nickel (Ni) of $0<Mn/(Ni+Mn)\leq0.1$. Doing this makes it possible to favorably produce the lithium nickel phosphate compound having an orthorhombic crystal structure in space group Cmcm when the mixture of the individual sources (i.e., the starting materials) is fired. On the other hand, the addition of a large amount of the Mn source to make $Mn/(Ni+Mn)$ significantly larger than 0.15 is unpreferred because this facilitates the production of the conventional lithium nickel phosphate compound assigned to the olivine structure and having a crystal structure in the Pnma space group.

The solvent used in the starting material mixed solution may be any solvent that can uniformly dissolve or disperse the previously indicated starting materials. For example, water or a mixed solvent in which water is the main component is preferably used. One or two or more organic solvents that are uniformly miscible with water (for example, lower alcohols, lower ketones) can be selected as appropriate and used as the solvent component other than water in this mixed solvent. For example, the use is preferred of an aqueous solvent in which at least 80% by mass (more preferably at least 90% by mass and even more preferably at least 95% by mass) is water. A particularly preferred example is an aqueous solvent substantially of water. Since the boiling point of water is approximately 100° C., this facilitates raising the temperature of the starting material mixed solution into the prescribed temperature region while suppressing excessive solvent evaporation.

The starting material mixed solution is prepared by weighing out the individual sources so as to provide $Mn/(Ni+Mn)\leq0.15$ as indicated above and mixing these in the solvent as described above. Stirring may be performed as necessary during preparation of the starting material mixed solution. This stirring operation can be performed using suitable stirring means, for example, a magnetic stirrer. Stirring makes it possible to carry out preparation of the starting material mixed solution in a short period of time. Because in the present constitution the Mn source is used in a smaller amount than the other sources (Li source, Ni source, and P source), the Mn source is desirably dissolved with stirring after the other sources have already been mixed to uniformity in the solvent. The starting materials may be completely dissolved in the starting material mixed solution or all or a portion of the starting materials may be dispersed in an undissolved state. Moreover, an additive, e.g., glycolic acid and/or a carboxylic acid, may also be introduced as necessary. These additives function, for example, as inhibitors of particle growth.

<The Heating Step>

A gel precipitate is obtained in the heating step by heating the starting material mixed solution prepared as described above and evaporating the solvent. There are no particular limitations on the means of heating the starting material mixed solution, and any means may be used, for example, an oil bath. The heating temperature will also vary as a function of the solvent used. For example, when water is used as the solvent, heating must be carried out at a temperature at which a satisfactory evaporation of the water occurs, and it will generally be suitable to bring to at least 70° C. (for example, 70 to 90° C., preferably about 75° C. to 85° C., and particularly preferably about 80° C.). The upper limit for the heating temperature should be a temperature below the boiling point of the solvent used. The heating time should be a time that provides a satisfactory diffusion or permeation of the starting materials through the liquid phase and a satisfactory development of gel precipitate production, and is generally about 5 to 48 hours and is preferably about 10 to 24 hours. A gel precipitate is produced from the starting material mixed solution by this heating process.

<The Pre-Firing Step>

A precursor (powder of the pre-fired material) is obtained in the pre-firing step by pre-firing the gel precipitate obtained as described in the preceding. The pre-firing temperature should be a temperature region relatively lower than the main firing temperature, infra, at which the individual components in the gel precipitate undergo a satisfactory reaction, and is generally 200° C. to 400° C., for example, about 200° C. to 38° C. (for example, 350° C.) is suitable. The pre-firing time should be a time sufficient for the individual components (typically the various ions) in the gel precipitate to undergo uniform diffusion and intermixing, and is generally about 5 to 48 hours and is preferably about 10 to 24 hours. There are no particular limitations on the firing means, and any means, e.g., an electric oven, may be used. There are no particular limitations on the firing atmosphere, and, for example, firing may be carried out in an air atmosphere, or as necessary firing may be carried out in an atmosphere of an inert gas, for example, Ar gas.

<The Carbon Material Coating Step>

At least a portion of the particle surface of the precursor (pre-fired material powder) is coated with a carbon material in the carbon material coating step. Coating with the carbon material can be carried out, for example, by mixing a carbon material with the precursor obtained by pre-firing and pulverizing using a suitable pulverizing apparatus (for example, a ball mill apparatus). The carbon material is compression bonded to the particle surface of the precursor (pre-fired material powder) by this pulverization treatment and the particle surface is thereby coated with the carbon material. Electrical conductivity is imparted by this coating of the carbon material. Another benefit is that a mechanochemical reaction is brought about by the heat of friction that is produced during the pulverization process and can degrade the impurity phase (for example, starting materials and reaction by-products) left present due to an inadequate reaction. There are no particular limitations on the pulverization time, and at least approximately 10 hours is suitable and ordinarily about 15 to 30 hours (for example, 25 hours) is preferred.

This coating of the particle surface of the precursor (pre-fired material powder) with the carbon material is an important factor from the standpoint of controlling the crystal structure of the lithium nickel phosphate compound to nonconventional space group Cmcm. That is, it is thought that, because the main firing in the present constitution is performed in a state in which the particle surface of the precursor (pre-fired material powder) is coated with a carbon material, the crystal structure of the lithium nickel phosphate compound can be controlled to the nonconventional Cmcm point group by the reducing action exercised by the carbon.

The amount of the carbon material coating is 10% by mass to 40% by mass with respect to the total mass of the precursor (pre-fired material powder). At below this range, the lithium nickel phosphate compound in space group Cmcm may not be consistently obtained. In addition, the lithium nickel phosphate compound-carbon material composite (positive electrode active material) obtained by the main firing may have a reduced electronic conductivity. At above this range, on the other hand, the decline in the proportion of the lithium nickel phosphate compound in the positive electrode active material results in a declining trend for the energy density of the lithium secondary battery fabricated using this positive electrode active material.

<The Main Firing Step>

The resulting carbon material-coated precursor is subjected to a main firing at 600° C. to 900° C. in the main firing step. This main firing converts the precursor into the lithium nickel phosphate compound having an orthorhombic crystal structure in space group Cmcm.

The firing temperature here is not particularly limited as long as it is a temperature at which synthesis of the target compound can be achieved; however, the firing temperature must be at least 600° C. in order to achieve a satisfactory development of the reaction, Exceeding a firing temperature of 900° C. is disadvantageous, on the other hand, because a tendency for sublimation to occur is then seen. A firing temperature of 600 to 900° C. is generally suitable, while 600 to 800° C. is preferred and 700 to 800° C. is more preferred. The firing time should be a time sufficient for the individual components in the precursor to uniformly react and is generally 1 to 10 hours and is preferably 3 to 6 hours and particularly preferably 4 to 5 hours. There are no particular limitations on the firing means, and any means may be used, for example, an electric oven. The firing atmosphere is preferably an inert gas atmosphere, for example, of Ar gas. Carrying out the main firing in an inert gas atmosphere makes possible a more stable production of the lithium nickel phosphate compound having an orthorhombic crystal structure in space group Cmcm.

A lithium nickel phosphate compound-carbon material composite in a microparticulate form with an average particle diameter of about 1 to 10 μm can be obtained preferably by cooling the lithium nickel phosphate compound-carbon material composite obtained by main firing and then grinding by, for example, milling, and carrying out a suitable classification.

The crystal structure of the herein disclosed lithium nickel phosphate compound is controlled to the nonconventional space group Cmcm when the precursor is subjected to the main firing at 600° C. to 900° C. because the individual sources are prepared so as to provide a molar ratio between manganese (Mn) and nickel (Ni) of $0<Mn(Ni+Mn)\leq0.15$ and because the main firing is carried out with the particle surface of the precursor being coated with the carbon material. This lithium nickel phosphate compound having a crystal structure in space group Cmcm has a more stable crystal structure at high potentials than the conventional olivine structure in the Pnma space group, and, for example, its crystal structure resists collapse even during charging to 6 V. As a consequence, the herein disclosed lithium nickel phosphate compound can be very favorably used as a positive electrode active material for lithium secondary batteries (typically lithium ion batteries).

Other than the use of the herein disclosed positive electrode active material, the lithium secondary battery can be fabricated using conventional materials and processes.

For example, a carbon black such as acetylene black or Ketjenblack or another powdered carbon material (e.g., graphite) may be mixed as an electroconductive material into the powder (positive electrode active material powder) prepared from the herein disclosed lithium nickel phosphate compound-carbon material composite. Besides the positive electrode active material and the electroconductive material, a binder, e.g., polyvinylidene fluoride (PVDF), styrene-butadiene rubber (SBR), polytetrafluoroethylene (PTFE), carboxymethyl cellulose (CMC), and so forth, may also be added. Dispersing and kneading these into a suitable dispersion medium yields a paste-form (here and below this also includes slurries and inks) composition for forming the positive electrode active material layer (also referred to below as the "positive electrode active material layer-forming paste"). A positive electrode for a lithium secondary battery can be fabricated by coating a suitable amount of this paste on a positive electrode current collector made of aluminum or an alloy having aluminum as its main component and additionally drying and pressing.

On the other hand, the lithium secondary battery negative electrode that functions as the counter electrode can be fabricated by the same procedures as are conventionally used. For example, the negative electrode active material should be a material capable of lithium ion insertion and extraction. A typical example is a particulate carbon material comprising, for example, graphite. Just as for the positive electrode, a paste-form composition for forming a negative electrode active material layer (also referred to below as the "negative electrode active material layer-forming paste") can be prepared by dispersing and kneading this particulate material with a suitable binder in a suitable dispersion medium. A negative electrode for a lithium secondary battery can be fabricated by coating a suitable amount of this paste on a negative electrode current collector preferably of copper or nickel or an alloy thereof and additionally drying and pressing.

The same separators as in conventional use may be used in a lithium secondary battery that uses the herein disclosed lithium nickel phosphate compound-carbon material composition in its positive electrode active material. For example, a porous sheet (porous film) comprising a polyolefin resin can be used.

In addition, the nonaqueous electrolytes (typically an electrolyte solution) heretofore used in lithium secondary batteries can be used as the electrolyte without particular limitation. Typically this is a composition in which a supporting electrolyte is incorporated in a suitable nonaqueous solvent. For example, a single selection or two or more selections from the group consisting of propylene carbonate (PC), ethylene carbonate (EC), diethyl carbonate (DEC), dimethyl carbonate (DMC), ethyl methyl carbonate (EMC), and so forth, can be used as the nonaqueous solvent. For example, one or two or more lithium compounds (lithium salts) selected from $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, $LiI$, and so forth, can be used as the supporting electrolyte.

There are no particular limitations on the shape (external shape and size) of the fabricated lithium secondary battery other than that the herein disclosed lithium nickel phosphate compound-carbon material composite is used as a positive electrode active material. The exterior may be a thin sheet type constituted of, for example, a laminate film, or the outer case of the battery may have a cylindrical or prismatic shape, or a small button shape may be used.

An embodiment of the use of the herein disclosed positive electrode active material is described in the following using a lithium secondary battery having a wound electrode assembly as an example, but this should not be taken to imply that the present invention is limited to or by this embodiment.

Figure 1:
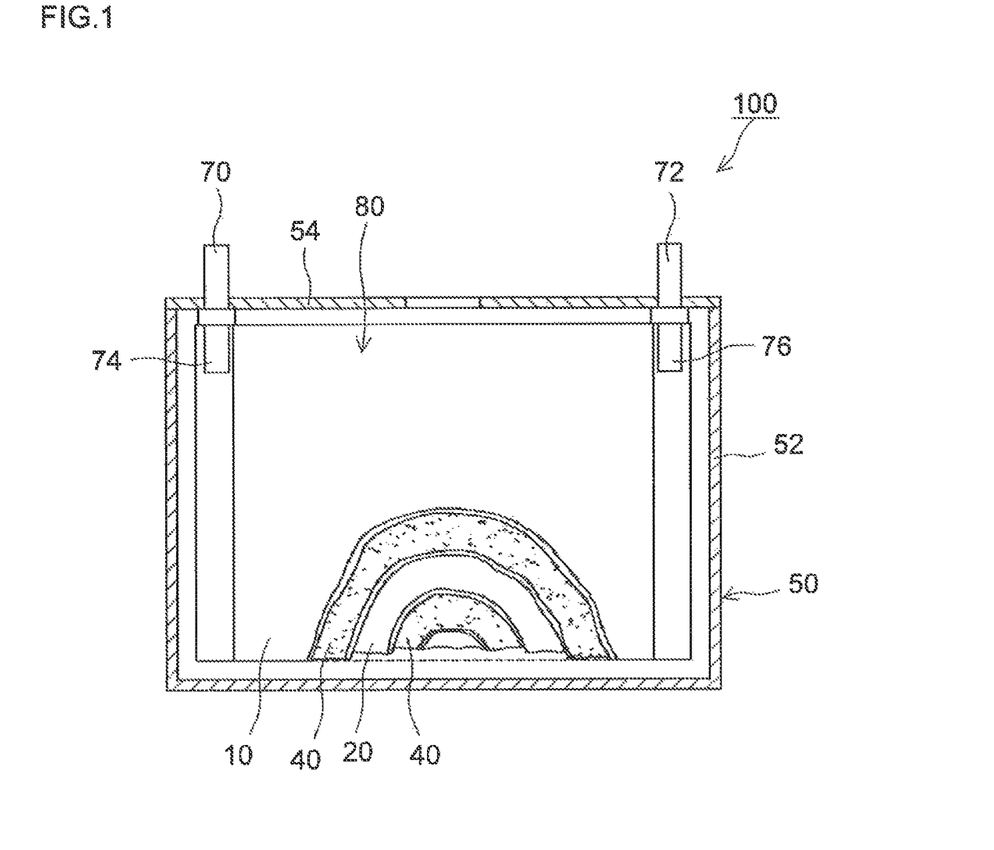
FIG. 1 is a diagram that schematically shows a lithium secondary battery according to an embodiment of the present invention.

As shown in FIG. 1, the lithium secondary battery 100 according to the present embodiment has a structure in which an electrode assembly (wound electrode assembly) 80—in the form of a long strip of a positive electrode sheet 10 and a long strip of a negative electrode sheet 20 that have been wound with a separator sheet 40 interposed therebetween and flattened—is housed with a nonaqueous electrolyte solution (not shown) in a container 50 having a shape (flat box shape) that can accommodate the wound electrode assembly 80.

The container 50 is provided with a container main body 52 having an open upper end and a rectangular parallelepiped shape, and a lid 54 that covers the open portion. A metal, e.g., aluminum, steel, and so forth, is preferably used as the material constituting the container 50 (aluminum is used in the present embodiment). Or, this may be a container 50 made by molding a resin such as polyphenylene sulfide resin (PPS), polyimide resin, and so forth. A positive electrode terminal 70 that electrically connects to the positive electrode of the wound electrode assembly 80 and a negative electrode terminal 72 that electrically connects to the negative electrode 20 of the electrode assembly 80 are disposed in the upper side of the container 50 (that is, the lid 54). The flat wound electrode assembly 80 and a nonaqueous electrolyte solution (not shown) are housed within the container 50.

The materials and members as such that constitute the wound electrode assembly 80 with the structure under consideration may be the same as for the electrode assembly in a conventional lithium secondary battery, with the exception that the herein disclosed lithium nickel phosphate compound-carbon material composite is used as a positive electrode active material, and are not particularly limited.

Figure 2:
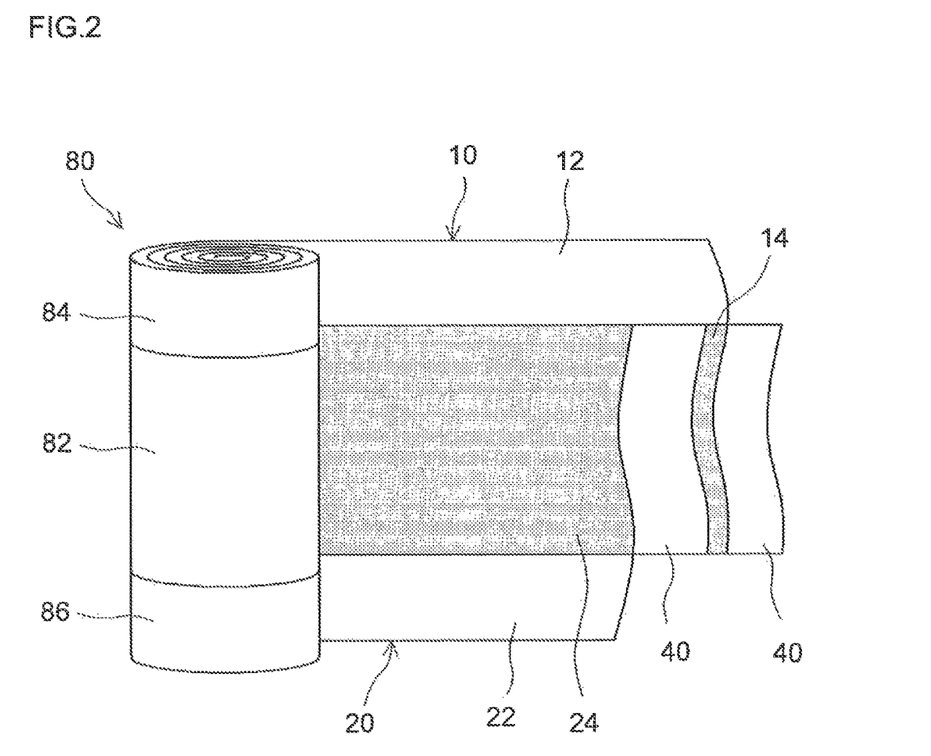
FIG. 2 is a diagram that schematically shows the electrode assembly in a lithium secondary battery according to an embodiment of the present invention.

As shown in FIG. 2, just as for the wound electrode assembly of an ordinary lithium secondary battery, the wound electrode assembly 80 according to the present embodiment has a long strip-shaped (band-shaped) sheet structure in the stage preceding assembly of the wound electrode assembly 80.

The positive electrode sheet 10 has a structure in which a positive electrode active material layer 14 containing a positive electrode active material is supported on both sides of a long sheet of a foil-shaped positive electrode current collector (abbreviated in the following as the "positive electrode current collector foil") 12. However, the positive electrode active material layer 14 is not attached at one side edge, considered in the width direction, of the positive electrode sheet 10 (the lower edge region in the figure) in order to form a positive electrode active material layer-free region where the positive electrode current collector 12 is exposed over a prescribed width.

The positive electrode active material layer 14 can as necessary contain one or two or more of the materials that can be used as structural components of the positive electrode active material layer in ordinary lithium secondary batteries. An electroconductive material is an example of such a material. A carbon material, e.g., a carbon powder or carbon fiber, is preferably used as this electroconductive material. Or, an electroconductive metal powder, e.g., nickel powder, may be used. Other materials that can be used as a component of the positive electrode active material layer can be exemplified by the various polymers that can function as a binder for the previously described constituent materials.

As with the positive electrode sheet 10, the negative electrode sheet 20 also has a structure in which a negative electrode active material layer 24 containing a negative electrode active material is supported on both sides of a long sheet of a foil-shaped negative electrode current collector (abbreviated in the following as the "negative electrode current collector foil") 22. However, the negative electrode active material layer 24 is not attached at one side edge, considered in the width direction, of the negative electrode sheet 20 (the upper edge region in the figure) in order to form a negative electrode active material layer-free region where the negative electrode current collector 22 is exposed over a prescribed width.

The negative electrode sheet 20 can be formed by placing a negative electrode active material layer 24, in which the main component is a negative electrode active material for a lithium ion battery, on a long strip-shaped negative electrode current collector 22. A copper foil or other metal foil suitable for the negative electrode is preferably used for the negative electrode current collector 22. One or two or more of the materials used in conventional lithium secondary batteries may be used without particular limitation for the negative electrode active material. Suitable examples are carbonaceous materials such as graphite carbon, amorphous carbon, and so forth, as well as lithium-containing transition metal oxides and transition metal nitrides.

The positive electrode sheet 10 and the negative electrode sheet 20 are stacked with a separator sheet 40 interposed therebetween when the wound electrode assembly 80 is fabricated. When this is done, the positive electrode sheet 10 and the negative electrode sheet 20 are stacked somewhat shifted relative to each other in the width direction in order to expose the positive electrode active material layer-free region of the positive electrode sheet 10 and the negative electrode active material layer-free region of the negative electrode sheet 20, respectively, at the two sides considered in the width direction of the separator sheet 40. The flat wound electrode assembly 80 can be fabricated by winding the thusly layered stack and flattening the resulting winding by pressing from the side direction.

A winding core region 82 (that is, a region where the positive electrode active material layer 14 of the positive electrode sheet 10, the negative electrode active material layer 24 of the negative electrode sheet 20, and the separator sheet 40 are closely stacked with each other) is formed in the central part, considered in the direction of the winding axis, of the wound electrode assembly 80. The electrode active material layer-free region is exposed for the positive electrode sheet 10 and for the negative electrode sheet 20, respectively, outside the winding core region 82 at the two edges, considered in the direction of the winding axis, of the wound electrode assembly 80. A positive electrode lead terminal 74 and a negative electrode lead terminal 76 are attached, respectively, to the exposed region (that is, the region where the positive electrode active material layer 14 is not formed) 84 on the positive electrode side and to the exposed region (that, the region where the negative electrode active material layer 24 is not formed) 86 on the negative electrode side and are electrically connected, respectively, to the positive electrode terminal 70 and the negative electrode terminal 72.

The wound electrode assembly 80 with the indicated structure is introduced into the container main body 52 and a suitable nonaqueous electrolyte solution is introduced (filled) into this container main body 52. The fabrication (assembly) of the lithium secondary battery 100 according to the present embodiment is then completed by sealing the opening in the container main body 52 by, for example, welding, with the lid 54. The process of sealing the container main body 52 and the process of introducing (filling) the electrolyte solution may be carried out using the same procedures as carried out in the production of conventional lithium secondary batteries. Conditioning (initial charge/discharge) is then performed on the battery. As necessary, a gas venting step, a quality inspection step, and so forth, may be performed.

The thusly fabricated lithium secondary battery 100 can exhibit improved battery characteristics because it is fabricated using the herein disclosed lithium nickel phosphate compound-carbon material composite as its positive electrode active material. For example, little capacity fade occurs even for use at high potentials where the positive electrode potential at the end of charging reaches to 6 V or more versus lithium, and excellent cyclic characteristics can thus be obtained.

Lithium secondary batteries (sample batteries) were fabricated in the following test examples using the herein disclosed lithium nickel phosphate compound-carbon material composite for the positive electrode active material and their performance was evaluated.

[Preparation of the Positive Electrode Active Material]

Example 1

Figure 3:
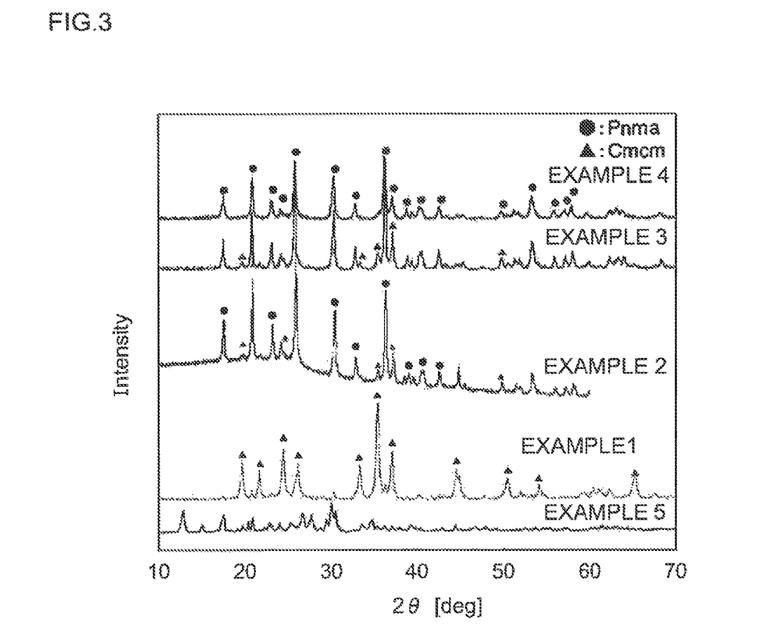
FIG. 3 is a diagram that shows the x-ray diffraction patterns for the lithium nickel phosphate compounds according to Examples 1 to 5.

A lithium nickel phosphate compound in which x in $LiNi_{(1-x)}Mn_xPO_4$ was x=0.01 was synthesized in this example. Specifically, lithium acetate dihydrate ($Li(CH_3COO).2H_2O$) as the Li source, nickel acetate tetrahydrate ($Ni(CH_3COO)_2.4H_2O$) as the Ni source, manganese acetate tetrahydrate ($MnCH_3COO)_2.4H_2O$) as the Mn source, and ammonium phosphate ($NH_4H_2PO_4$) as the P source were weighed out so as to provide the prescribed molar ratio (Mn/(Ni+Mn)=0.01) and were dissolved in water while stirring to produce a starting material mixed solution. To this starting material mixed solution was added glycolic acid, at five times the amount being synthesized, as a particle growth inhibitor. The starting material mixed solution was heated to approximately 80° C. on an oil bath and the water was evaporated to obtain a gel precipitate. This gel precipitate was subjected to pre-firing at 350° C. and the resulting precursor (pre-fired material) was pulverized on an interim basis. The precursor (pre-fired material) was pulverized using an ordinary ball mill apparatus. At this time, carbon black was weighed out as the carbon material to provide a mass ratio between the precursor (pre-fired material) and the carbon black of 8:2 and mixing was carried out for 25 hours to attach the carbon black to the surface of the precursor (pre-fired material) particles. These carbon black-attached precursor particles were additionally subjected to main firing under an Ar gas atmosphere. The fired material was ground using a ball mill to a suitable particle diameter to obtain a powder of a composite material that contained the lithium nickel phosphate compound as the positive electrode active material and carbon black as the carbon material (positive electrode active material-carbon material composite powder). As shown in FIG. 3, the peaks originating with an orthorhombic crystal structure in space group Cmcm could be confirmed when the obtained composite material powder was analyzed by x-ray diffraction measurements. The black triangles in the figure show the peak positions for space group Cmcm.

Example 2

A lithium nickel phosphate compound was synthesized as in Example 1, but using Mn/(Ni+Mn)=0.05 in this example. As shown in FIG. 3, a mixture of two different types of crystal structures, in space group Cmcm and the Pnma space group, could be confirmed when the resulting lithium nickel phosphate compound was analyzed by x-ray diffraction measurements.

Example 3

A lithium nickel phosphate compound was synthesized as in Example 1, but using Mn/(Ni+Mn)=0.10 in this example. As shown in Example 3 of FIG. 3, a mixture of two different types of crystal structures, in space group Cmcm and the Pnma space group, could be confirmed when the resulting composite material powder was analyzed by x-ray diffraction measurements.

Example 4

A lithium nickel phosphate compound was synthesized as in Example 1, but using Mn/(Ni+Mn)=0.20 in this example. As shown in FIG. 3, when the resulting composite material powder was analyzed by x-ray diffraction measurements, it was confirmed to have taken on an orthorhombic crystal structure in the Pnma space group. The black circles in the figure show the peak positions for the Pnma space group.

Example 5

A lithium nickel phosphate compound was synthesized as in Example 1, but using Mn/(Ni+Mn)=0 (that is, Mn was not added) in this example. As shown in FIG. 3, LiNiPO$_4$ with an olivine-type structure was not obtained according to analysis of the resulting composite material powder by x-ray diffraction measurements, and peaks assigned to impurity phases, e.g., NiO$_2$ and so forth, were observed.

<Fabrication of Nonaqueous Electrolyte Secondary Batteries (Sample Batteries)>

Samples of nonaqueous electrolyte secondary batteries were fabricated using the composite material powders (carbon black-attached lithium nickel phosphate compound powder) according to Example 1 and Example 4. These samples were fabricated in order to ascertain whether the carbon black-attached lithium nickel phosphate compound powder obtained in these examples could tolerate use at high potentials, and may be different from the structure of batteries used in actual practice. These samples were fabricated as follows. First, the composite material powder obtained as described above and polyvinylidene fluoride (PVdF) as a binder were weighed out to provide a 95:5 mass ratio and were mixed in N-methylpyrrolidone (NMP) to produce a paste-form positive electrode active material composition. This paste-form positive electrode active material layer composition was coated as a layer on one side of an aluminum foil (positive electrode current collector) and dried to produce a positive electrode sheet in which the positive electrode active material layer was disposed on one side of this positive electrode current collector.

Figure 4:
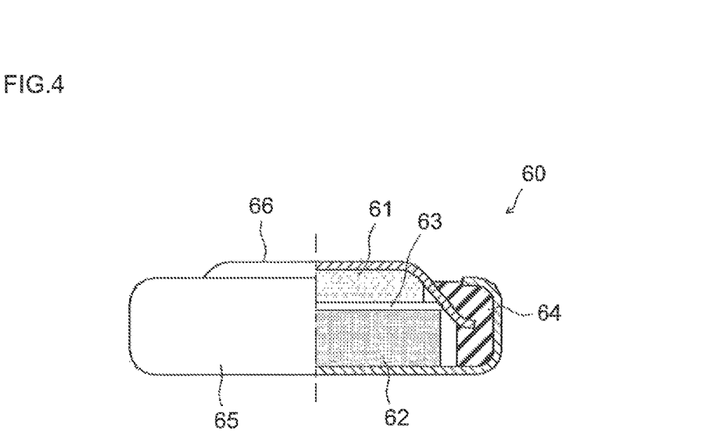
FIG. 4 is a diagram that schematically shows a test coin cell.

A positive electrode was fabricated by punching this positive electrode sheet into a circle with a diameter of 16 mm. This positive electrode (working electrode), lithium metal (a lithium metal foil with a diameter of 19 mm and a thickness of 0.02 mm was used) as the negative electrode (counter electrode), and a separator (a three-layer porous sheet of polypropylene (PP)/polyethylene (PE)/polypropylene (PP) with a diameter of 22 mm and a thickness of 0.02 mm was used) were inserted into a stainless steel container along with a nonaqueous electrolyte to fabricate the coin cell 60 (half cell for evaluating the charge/discharge performance) shown in FIG. 4 having a diameter of 20 mm and a thickness of 3.2 mm (2032 type). In FIG. 4, reference number 61 indicates the positive electrode (working electrode); reference number 62 indicates the negative electrode (counter electrode); reference number 63 indicates the electrolyte solution-impregnated separator; reference number 64 indicates a gasket; reference number 65 indicates the container (negative electrode terminal); and reference number 66 indicates the lid (positive electrode terminal). The nonaqueous electrolyte used contained LiPF$_6$ as the supporting electrolyte at a concentration of approximately 1 mol/liter in a mixed solvent that contained ethylene carbonate (EC) and dimethyl carbonate (DMC) and ethyl methyl carbonate (EMC) at a volumetric ratio of 3:3:4.

<Cyclic Voltammetric (CV) Measurements>

Cyclic voltammetric (CV) measurements were carried out on the nonaqueous electrolyte secondary batteries (sample batteries) obtained as described above. The measurement conditions were as follows: potential scan range for the working electrode versus the lithium metal plate=3 V to 5.5 V (vs. Li$^+$/Li); potential scan rate=0.5 mV/s. After this CV measurement had been repeated for 5 cycles, the battery was disassembled; the composite material powder (carbon black-attached lithium nickel phosphate compound powder) was removed; and the change in the crystal structure due to the CV measurement was determined by x-ray diffraction measurements. The change in the x-ray diffraction pattern pre-versus-post-CV measurement is shown in FIG. 5 (Example 1) and FIG. 6 (Example 4).

Figure 5:
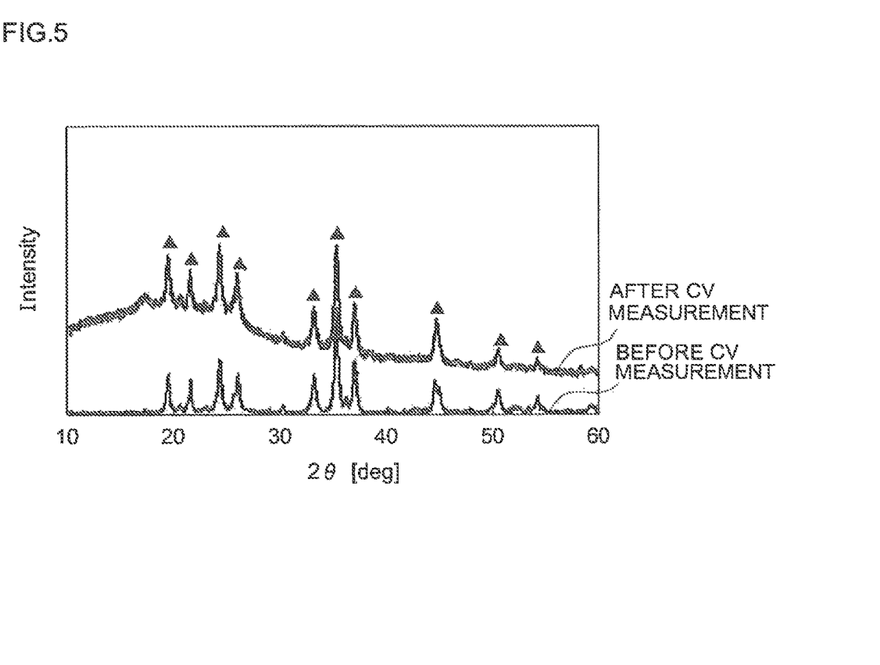
FIG. 5 is a diagram that shows the change in the x-ray diffraction pattern pre-versus-post-CV measurement for the lithium nickel phosphate compound according to Example 1.
Figure 6:
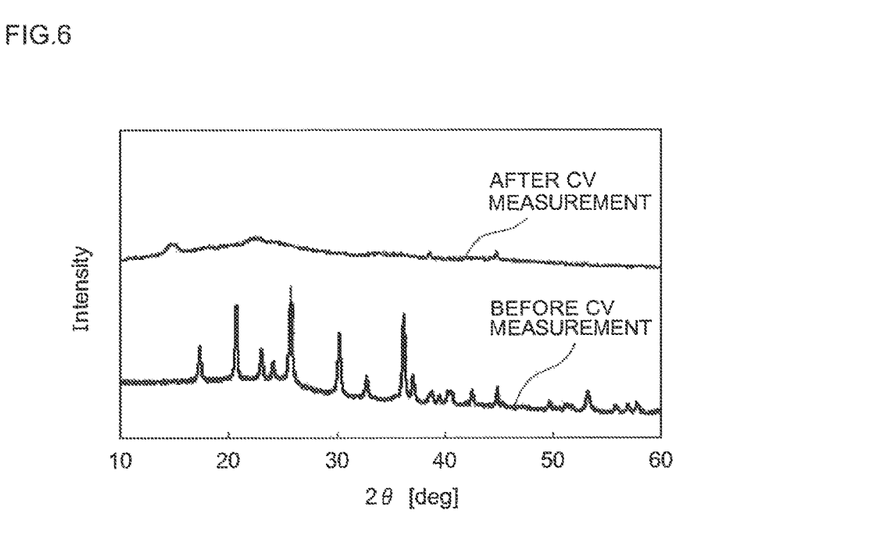
FIG. 6 is a diagram that shows the change in the x-ray diffraction pattern pre-versus-post-CV measurement for the lithium nickel phosphate compound according to Example 4.

As shown in FIG. 5, the lithium nickel phosphate compound according to Example 1 did not present a significant change in its crystal structure even after the CV measurement and the crystal structure in space group Cmcm was suitably retained. In contrast to this, as shown in FIG. 6, for the lithium nickel phosphate compound according to Example 4 almost no peaks were seen after the CV measurement and it was thus demonstrated that the crystal structure in the Pnma space group had substantially collapsed. Based on these results, it could be confirmed that the lithium nickel phosphate compound represented by LiNi$_{(1-x)}$Mn$_x$PO$_4$ (wherein 0<x≤0.15) and having a crystal structure belonging to space group Cmcm had a more stable crystal structure than the conventional olivine-type structure belonging to space group Pnma and even in a high-potential charged state exhibited little cycle deterioration due to changes in crystal structure.

The present invention has been described in the preceding using preferred embodiments, but this description is not limiting and various modifications are clearly possible.

Figure 7:
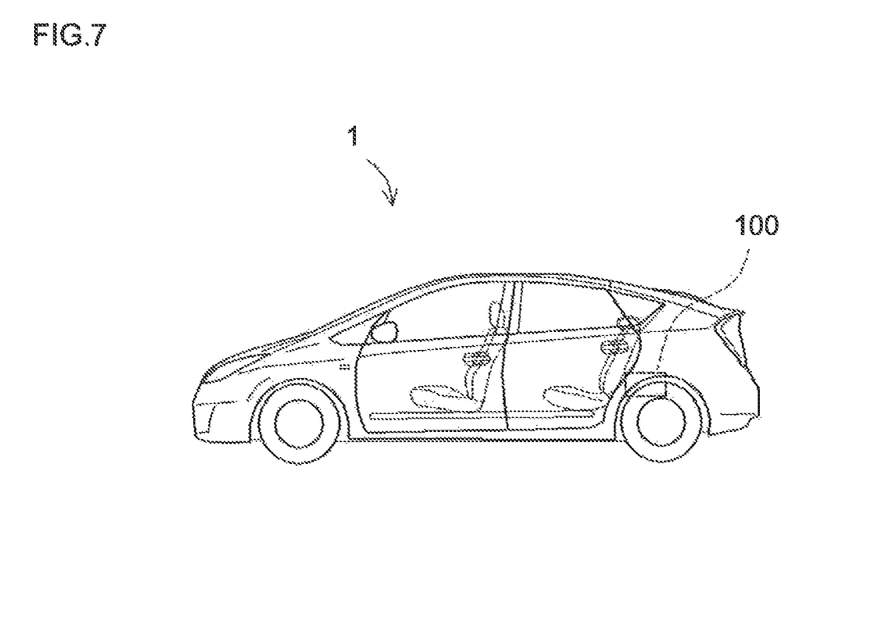
FIG. 7 is a side view diagram that schematically shows a vehicle equipped with a lithium secondary battery according to an embodiment of the present invention.

All of the herein disclosed lithium secondary batteries 100—because they exhibit, even in a high potential state as has been described in the preceding, little of the cycle deterioration caused by changes in the crystal structure of the positive electrode active material—are provided with properties that are well adapted for application as a vehicle-mounted battery. The present invention therefore provides, as shown in FIG. 7, a vehicle 1 that is provided with the herein disclosed lithium secondary battery 100 (possibly in the form of a battery pack in which a plurality of the lithium secondary batteries are connected). In particular, a vehicle (for example, an automobile) is provided in which this lithium secondary battery is provided as the drive power source (typically the drive power source in a hybrid vehicle or an electric vehicle).

INDUSTRIAL APPLICABILITY

The present invention can provide a positive electrode active material that exhibits little change in crystal structure even in a high potential state. Accordingly, through the use of this positive electrode active material, the present invention can provide a lithium secondary battery that exhibits excellent cycle characteristics. In particular, a lithium secondary battery can be provided that exhibits little cycle deterioration even upon repeated high potential charge/discharge (for example, a vehicular lithium secondary battery used as the power source for driving the vehicle).

The invention claimed is:

1. A lithium secondary battery comprising a positive electrode active material,
wherein the positive electrode active material contains a particle formed of a lithium nickel phosphate compound represented by the following general formula $$LiNi_{(1-x)}Mn_xPO_4 \text{ wherein } 0.0001 \leq x \leq 0.01,$$

at least a portion of the surface of the particle is coated with carbon, and
the crystal structure of the lithium nickel phosphate compound is an orthorhombic crystal structure that has been controlled to space group Cmcm by a reducing action of the carbon.

2. A positive electrode active material for a lithium secondary battery, comprising a particle formed of a lithium nickel phosphate compound represented by the following general formula $$LiNi_{(1-x)}Mn_xPO_4 \text{ wherein } 0.0001 \leq x \leq 0.01,$$

wherein at least a portion of the surface of the particle is coated with carbon, and
the crystal structure of the lithium nickel phosphate compound is an orthorhombic crystal structure that has been controlled to space group Cmcm by a reducing action of the carbon.

3. A method of producing a positive electrode active material for a lithium secondary battery, comprising:
producing a starting material mixed solution by mixing, in a solvent, starting materials for a positive electrode active material formed of a lithium nickel phosphate compound represented by the following general formula $$LiNi_{(1-x)}Mn_xPO_4 \text{ wherein } 0.0001 \leq x \leq 0.01$$

the starting materials being prepared so as to provide a molar ratio between manganese (Mn) and nickel (Ni) of $0 < Mn/(Ni+Mn) \leq 0.01$;
heating the starting material mixed solution to obtain a precipitate;
pre-firing this precipitate to obtain a precursor;
coating at least a portion of the particle surface in the precursor with carbon; and
subjecting the carbon-coated precursor to a main firing in the temperature region of 600° C. to 900° C. in an inert gas atmosphere, and through a reducing action of the carbon, making the crystal structure of the lithium nickel phosphate compound an orthorhombic crystal structure composed of space group Cmcm.

4. The production method according to claim 3, wherein the coating with the carbon is carried out by treatment with a ball mill.

5. The production method according to claim 3, wherein an amount of the carbon coating is 10% by mass to 40% by mass with respect to a total mass of the precursor obtained by pre-firing.

6. The lithium secondary battery according to claim 1, wherein
the average particle diameter of the lithium nickel phosphate compound based on laser diffraction/scattering method is larger than 2 μm and 10 μm or less.

7. The lithium secondary battery according to claim 1, wherein the amount of the carbon, expressed with reference to the total mass of the lithium nickel phosphate compound, is 5 to 30% by mass.

* * * * *